United States Patent [19]
Easterling et al.

[11] Patent Number: 5,651,049
[45] Date of Patent: *Jul. 22, 1997

[54] RF CONNECTED MESSAGE RECORDING DEVICE AND METHOD FOR A TELEPHONE SYSTEM

[75] Inventors: Scott Douglas Easterling, Malabar; John C. Lee Voelkel, Palm Bay; Michael Gene Moeller, Satellite Beach; Michael J. Lynch, Merritt Island, all of Fla.

[73] Assignee: Harris Corporation, Melbourne, Fla.

[*] Notice: The term of this patent shall not extend beyond the expiration date of Pat. No. 5,648,999.

[21] Appl. No.: 297,849

[22] Filed: Aug. 30, 1994

[51] Int. Cl.⁶ .................................................. H04Q 7/14
[52] U.S. Cl. ............................. 379/412; 455/38.2; 379/77
[58] Field of Search .......................... 379/57, 58, 61, 379/67, 68, 70, 74, 75, 76, 77, 88; 455/89, 90, 35.1, 36.1, 38.1, 38.2, 51.2

[56] References Cited

U.S. PATENT DOCUMENTS

| | | | |
|---|---|---|---|
| 4,825,456 | 4/1989 | Rosenberg | 379/57 |
| 4,942,598 | 7/1990 | Davis | 379/57 |
| 5,031,230 | 7/1991 | Sandahl et al. | 455/51.2 X |
| 5,184,971 | 2/1993 | Williams | 379/88 X |
| 5,279,514 | 1/1994 | Lacombe et al. | 446/297 |
| 5,317,624 | 5/1994 | Obana et al. | 379/61 |
| 5,367,560 | 11/1994 | Watanabe et al. | 379/88 |
| 5,390,362 | 2/1995 | Modjeska et al. | 379/57 X |

*Primary Examiner*—Dwayne Bost
*Assistant Examiner*—William G. Trost
*Attorney, Agent, or Firm*—Rogers & Killeen

[57] ABSTRACT

A system and method of remotely recording a telephone message at a selected recording device connected to a telephone receiver by an RF link may include a base station having an RF transmitter connected to a telephone receiver, and plural paging/recording devices, each with an RF receiver and a message recorder. The paging/recording devices may be contained within suitable children's toys. A caller calls the telephone receiver and when the telephone connection has been made provides a first code signal to the telephone receiver to gain access to the RF transmitter, and then provides a second code signal to identify a particular paging/recording device that is to receive and record the message.

24 Claims, 5 Drawing Sheets

RF CONNECTED MESSAGE RECORDING DEVICE AND METHOD FOR A TELEPHONE SYSTEM

BACKGROUND OF THE INVENTION

The present invention relates to message recording devices and methods for telephone systems, and more particularly to a message recording device and method in which plural message recording devices, contained within a toy, are connected to the telephone receiver via a radio frequency link and are selectively designated to record a message.

Various devices for recording messages received at a telephone receiver are known, such as the ubiquitous answering machine. Most such devices are intended to be operated by technically unsophisticated users, but generally fall well short of this goal. They are not "child's play"; and it is one of the objects of the present invention to provide a message recording device with different capabilities than conventional recording devices that is "child's play" to operate.

It is desirable that the device be small so that it can fit inside a child's toy. While small recording devices that fit into toy bears are known, the recording devices are operated only from the toy bear. That is, there is no way to remotely operate the recorder to leave a message. See, for example, U.S. Pat. No. 5,279,514 issued to Lacombe, et al. Jan. 18, 1994. Thus, a parent desiring to leave a message for a child on the bear's recording device cannot do so from the office or when otherwise away from home.

A conventional telephone message recording device for leaving messages from a remote location is connected to a telephone receiver, and records messages received at the telephone receiver when the receiver is placed off hook electronically by the recording device. A memory device (e.g., tape player, analog solid state storage) records the messages, and may be played back and heard by anyone able to operate the device.

Some callers may want to leave different messages for different recipients, and thus it is desirable to provide another message recording device that may also receive messages received at the telephone receiver so that callers may leave separate messages on separate recorders that are destined for different recipients. As is known, a second message recording device may be connected to the first device by a radio link. A caller may select which one of the two recording devices is to receive a message, and the recipient of the message will be assured a modicum of privacy in that the message is not available on the other recording device. A caller may include a code in his incoming signal to indicate whether the first or second device is to receive and record the incoming message if the indicated one of the first and second devices is not answered. See, for example, U.S. Pat. No. 5,317,624 issued to Obana, et al. May 31, 1994.

However, such message recording devices are often too large to be portable, and clearly unsuitable for use by a child. Further, there is no indication how a multiplicity of recording devices may be accessed with an RF link from a single telephone receiver (Obana, et al. use an RF link to only one recorder.) The ability to provide a single telephone line with a pager/recorder system with multiple users is desirable as this ability makes such a system available for home use (where only one telephone line is typically found).

Accordingly, it is an object of the present invention to provide a novel system and method for recording telephone messages at plural recorders that obviates the problems of the prior art.

It is another object of the present invention to provide a novel system and method for recording voice messages received at a single telephone receiver on a selected one of plural recorders that are connected to the telephone receiver with an RF link.

It is yet another object of the present invention to provide a novel system and method for recording telephone messages at plural recorders in which access to the multiple recorders is achieved with a first code signal and a specific recorder is selected with a second code signal.

It is still another object of the present invention to provide a novel child's toy and transceiver system in which a telephone message may be recorded at a child's toy connected to a telephone receiver with a radio transceiver system.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
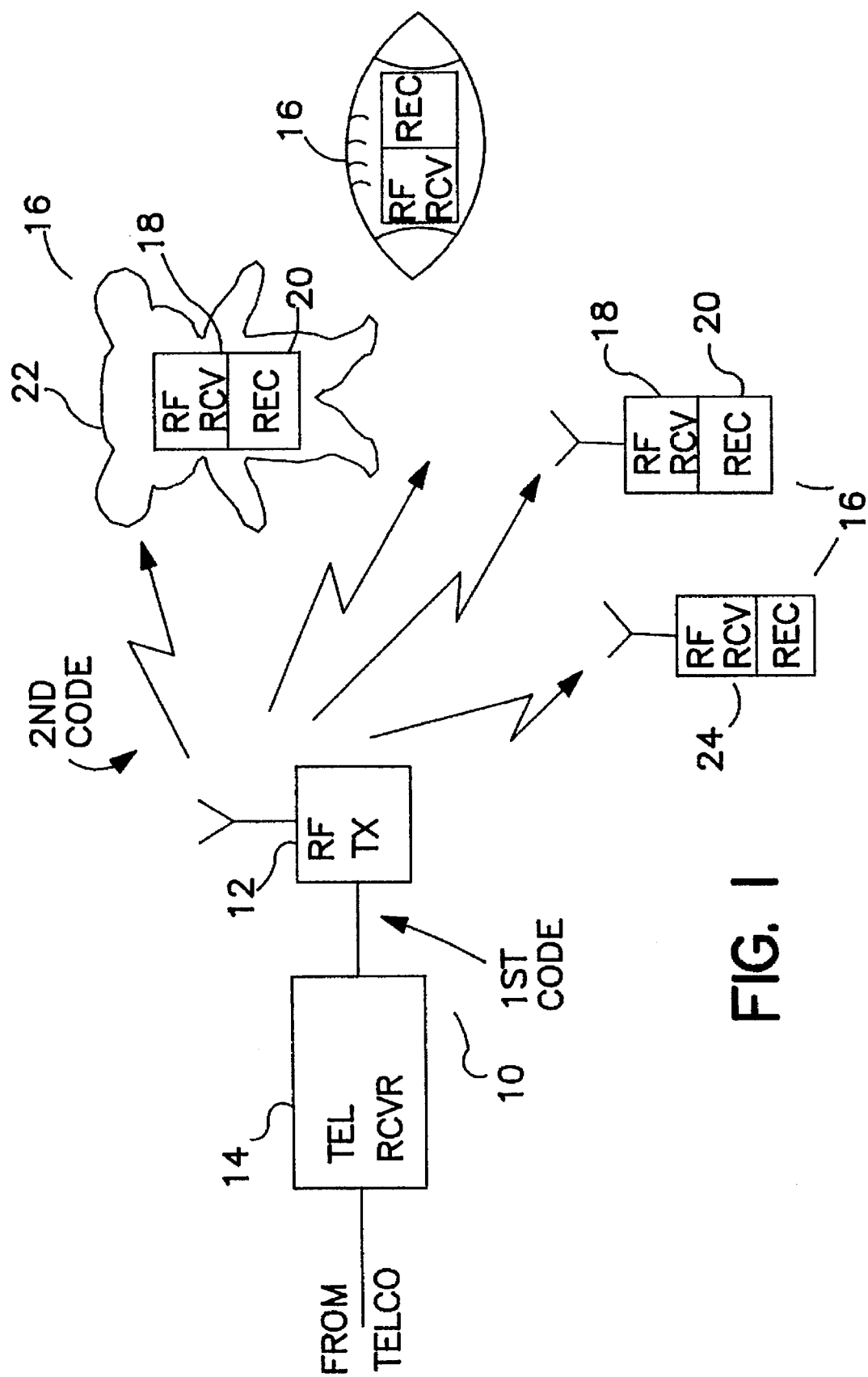
FIG. 1 is a pictorial depiction of an embodiment of a system of the present invention.

With reference now to FIG. 1, an embodiment of the present invention may include (a) base station 10 having a radio frequency (RF) transmitter 12 connected to a telephone receiver 14, and (b) plural paging/recording devices 16, each with an RF receiver 18 and recorder 20. The devices 16 may be contained within suitable children's toys 22 (e.g., plush animal, doll, car or building model, or a replica of a piece of sports equipment, statuette, piece of child's furniture, etc.) The devices 16 may be remote from the base station 10 (i.e., within range of the RF transmitter.) The telephone receiver may be connected to any telephone system, such as conventional public telephone systems and private exchanges.

In operation, a caller calls the telephone receiver and when the telephone connection has been made provides a first code signal to the telephone receiver 12 to gain access to the RF transmitter 12, and then provides a second code signal to identify a particular paging/recording device 16 that is to receive and record the message. The telephone receiver 14 is assigned a particular first code, and each of the devices 16 is assigned a second code that is unique within the group of devices 16 handled by receiver 14. Users are informed of the codes and provided with operating instructions so that prerecorded instructions do not have to be provided by the telephone receiver (although they may be.)

Figure 2:
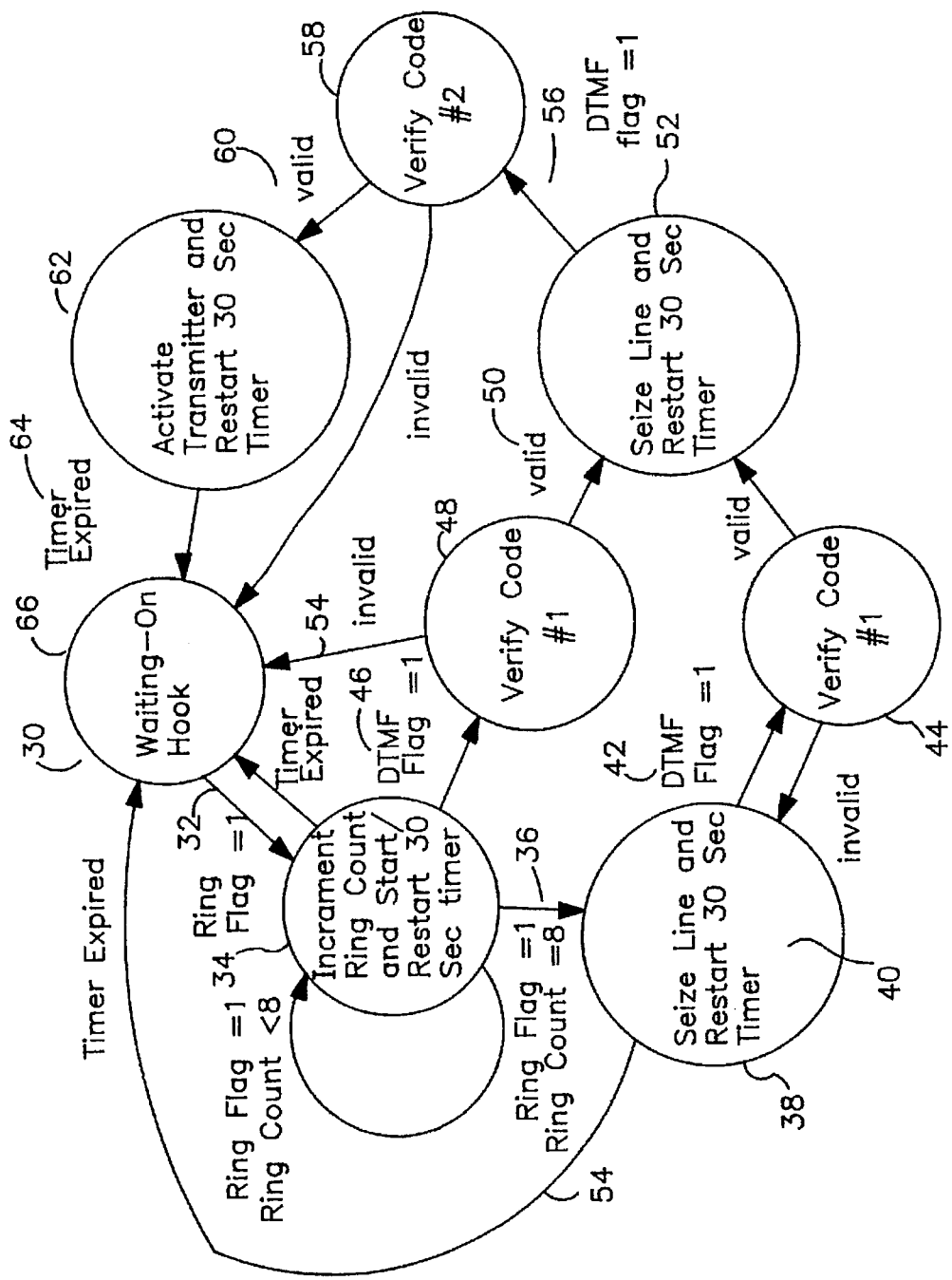
FIG. 2 is a flow diagram of the operation of an embodiment of a base station of the present invention.
Figure 3:
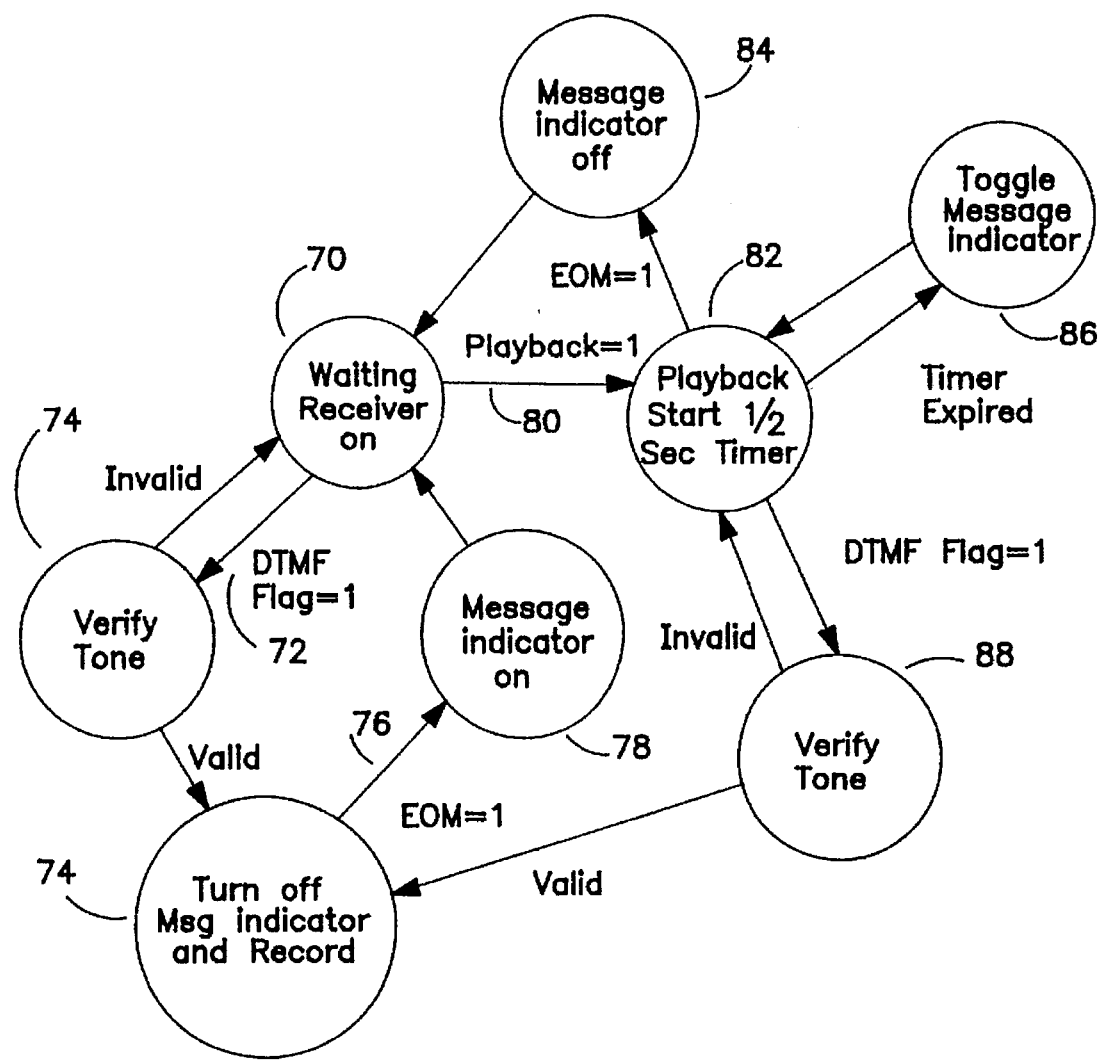
FIG. 3 is a flow diagram of the operation of an embodiment of a paging/recording device of the present invention.

The operation of an embodiment of the present invention may be more clearly understood with reference to FIG. 2 (base station operation) and FIG. 3 (paging/recording device operation). As shown in FIG. 2, a telephone receiver may be waiting and be on hook 30. Upon receipt of a ring signal 32, a flag may be set and the number of rings counted 34. If the telephone is not answered upon receipt 36 of a predetermined number of rings (e.g., eight is indicated in FIG. 2) the line is seized 38 and is electronically placed off hook. A timer 40 may be used to allow a period of time for a first code to be entered. The first code will be used to access the RF transmitter 12, and may consist of, for example, one or more DTMF tones. In the example of FIG. 2, the first code consists of two DTMF tones. If the first tone is entered 42 within the allotted time period, the first tone is checked for validity 44. If the first tone is entered 46 before the receipt of the predetermined number of rings, the first tone may be checked for validity 48 and, if the first tone is valid 50, the line may be seized and the timer started 52. In either event, if a valid first tone is not entered before the expiration of the allotted time, the telephone receiver is returned to on hook 54.

Once the line has been seized and a valid first tone has been entered, the caller enters the second tone of the first code. If the second tone is entered within a predetermined time period 56, the second tone is checked for validity 58. (Similar steps may be followed where the first code consists of more tones or different signals.) When the entire first code has been entered and verified 60, the caller is granted access 62 to the RF transmitter for a predetermined period of time. The period of time is set by the length of the message that may be received at the paging/recording devices 16. For example, an analog solid state storage device is presently able to record about twenty seconds of message, and the transmitter may be limited to about thirty seconds. Different time periods may be used with other recording devices. The RF transmitter transmits on its assigned transmission frequency the caller's voice message that is received from the telephone receiver. Upon expiration of the allotted time 64, the telephone receiver may be returned to on hook 66.

As shown in FIG. 3, the RF receiver in the paging/recording device is monitoring 70 the transmission frequency of the RF transmitter while the RF receiver is on. When a signal from the RF transmitter is received, the message is checked to determine whether it is directed to this device. To this end, the caller provides a second code that identifies the device to which the message is directed. The second code is provided by the caller at the beginning of the transmission of the message from the RF transmitter. The code may be as complex as needed for the number of devices associated with the RF transmitter. For example, the second code 72 illustrated in FIG. 3 could be a single DTMF tone (i.e., twelve codes being available.) The code is checked for validity 74 and, if the code is valid, the recording device is operated 74 to record the message. The end of the message 76 may be indicated by the end of the allotted time period, or by an end of message indication sent automatically by the RF transmitter at the end of its time period, or selectively by the caller (e.g., another DTMF code.) When the message has ended, an indicator at the paging/recording device may be activated 78 to inform the recipient that a message has been recorded. When the indicator has been activated, the device returns to a listening mode 70.

The message is played back by activation 80 of a playback switch. The recorder plays back the message 82, the message indicator is turned off 84, and the device returned to a listening mode. The message may be replayed when the playback switch is pressed again.

In addition, the capability to insert the first and second codes at the telephone receiver may be included. That is, messages may be recorded by entering the codes at the receiver directly, such as by lifting the receiver handset (off hook) and entering the codes at the receiver handset. The operation would thereafter continue as described above.

A caller may record messages at various recorders in a single telephone call by reentering the first code to regain access to the transmitter and entering a new second code, after the end of the transmit period for the previous message.

Figure 4:
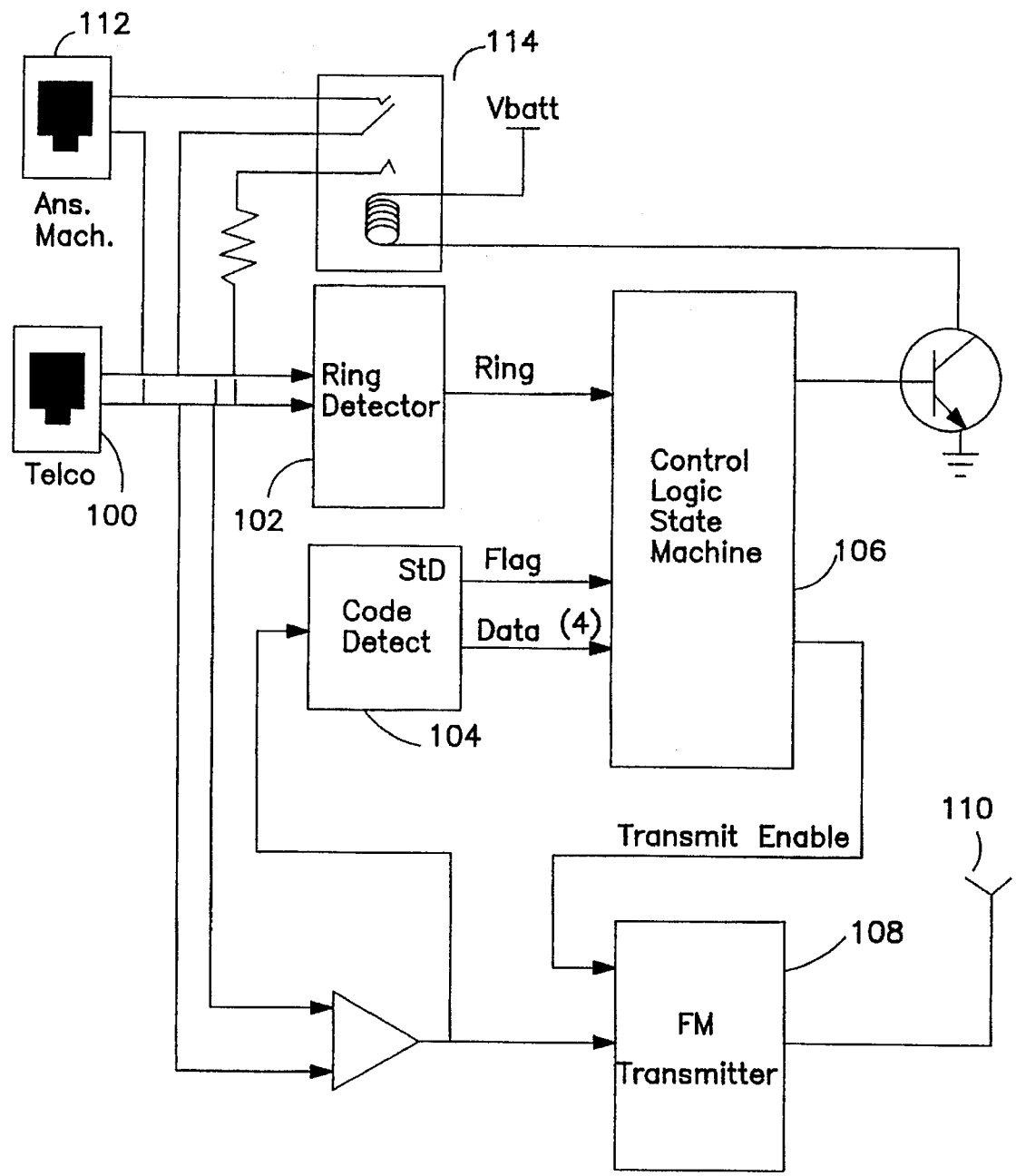
FIG. 4 is a block diagram of an embodiment of a base station that operates in the manner illustrated in FIG. 2.

With reference now to FIG. 4, a preferred embodiment of the base station may include a conventional connection 100 to a telephone line, a conventional ring detector 102, a code identifier 104 (in this example, a DTMF decoder such as the Teltone M-8870), a logic circuit 106 for performing the operation described above (e.g., an IC timer, such as the National NE555, and an IC programmable logic array, such as the 22V10), and an RF transmitter 108 with antenna 110 (in this example, an FM transmitter such as used in a conventional "baby monitor" operating at 49 MHz.) A connection 112 for an answering machine may be included, with appropriate override connections 114 to allow operation of the present invention.

Figure 5:
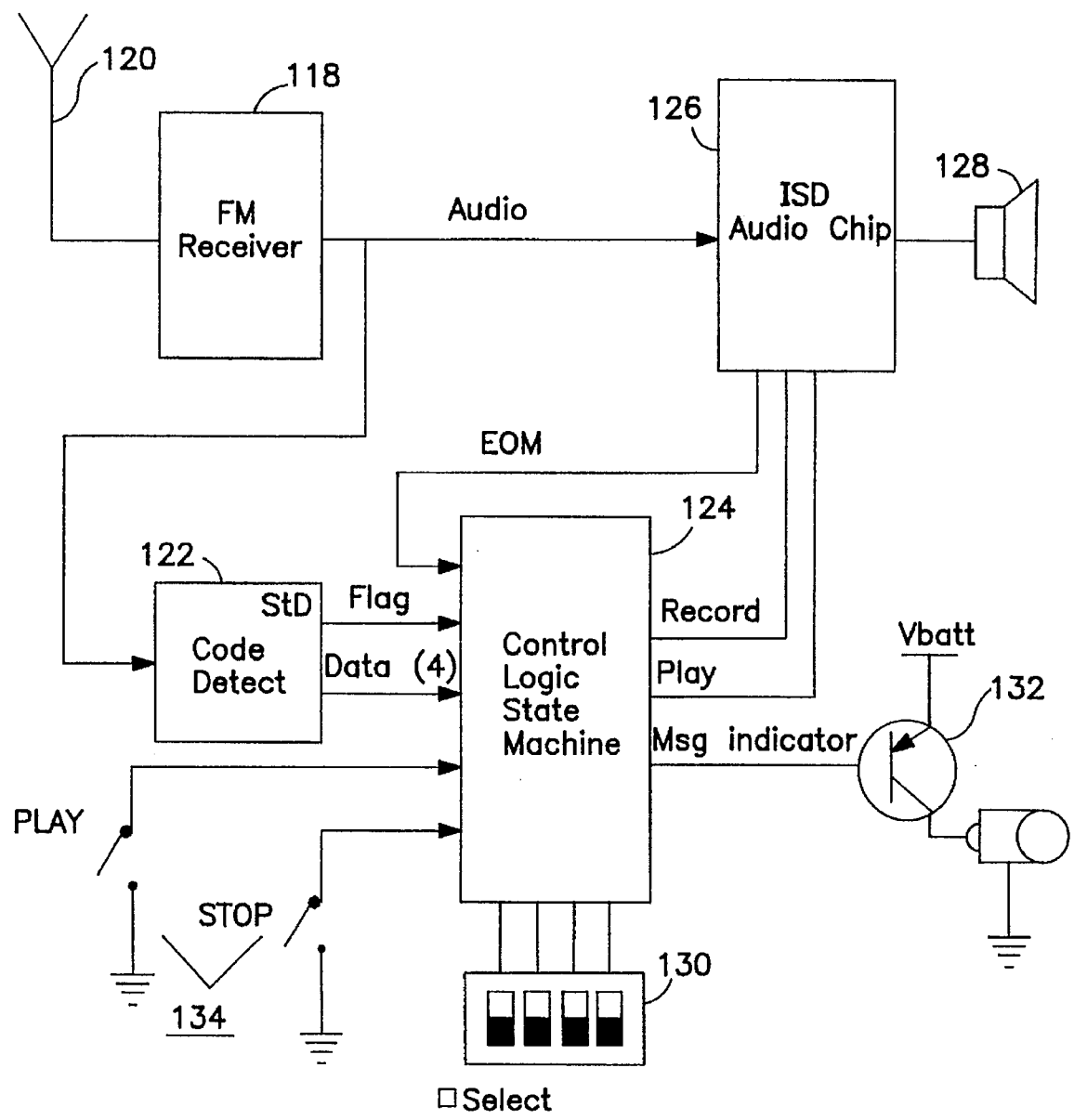
FIG. 5 is a block diagram of an embodiment of a paging/recording device that operates in the manner illustrated in FIG. 3.

With reference now to FIG. 5, a preferred embodiment of a paging/recording device may include an RF receiver 118 with antenna 120 (in this example, an FM transmitter such as used in a conventional "baby monitor" operating at 49 MHz), a code identifier 122 (in this example, a DTMF decoder such the Teltone M-8870), a logic circuit 124 for performing the operation described above (e.g., an IC timer, such as the National NE555, and an IC programmable logic array, such as the 22V10), an audio recorder 126 (in this example, an IC recorder such as the ISD 1010), a speaker 128 (e.g., an 8 ohm speaker is suitable for operation with the ISD 1010), a switch 130 for inserting the second code (e.g., a four position DIP switch), a message indicator 132, and recorder operating switches 134. The message indicator 132 may be any appropriate device, such as a visual indicator (e.g., an LED as illustrated in FIG. 5), an aural indicator (e.g., soft beeps), or a vibration inducing component. Plural audio recorders 126 may be included to record additional messages, if desired.

The paging/recording device may be simple in that it may provide only two exterior features for the message recipient; an indicator that a message has been recorded, and a playback switch. These features may be located as appropriate for the type of paging/recording device. In the event the paging/recording device is inside a child's toy, the playback switch may be located imaginatively to evoke a child's interest and fascination. For example, the switch may be contained in a hand of an animal (activated by squeezing the hand), a nose of a doll, a hood ornament of a model car, or other places too numerous to mention. The indicator may be lights in an animal's eyes, headlights of a toy car, etc.

The integration of a simple to operate recorder/playback machine into a child's toy provides an attractive and fascinating device which can be readily operated by a young child without supervision. Because the device is intended to be used by a person of tender age, the present invention includes a simple but effective code scheme to prevent unauthorized access.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A system for remotely recording voice messages received at a telephone receiver, the system comprising:
   a telephone receiver having an interface with a public telephone system, said telephone receiver comprising,
   means for identifying first tone codes received at said telephone receiver when said telephone receiver is off hook, and an RF transmitter activated by a predetermined one of said first tone codes for transmitting for a predetermined time period after activation voice messages being received at said telephone receiver; and at least one recorder remote from said telephone receiver, each said recorder comprising, an RF receiver contained within a child's toy for receiving said voice messages from said RF transmitter, means for identifying second tone codes received at said telephone receiver over said public telephone system and transmitted from said RF transmitter to said RF receiver, a memory device for recording said voice messages activated by a predetermined one of said second tone codes for recording said voice messages, said memory device having means for selective playback of recorded ones of said voice messages.

2. The system of claim 1 wherein said means for identifying said first tone codes comprises a DTMF receiver.

3. The system of claim 2 wherein each of said first tone codes includes two DTMF tones.

4. The system of claim 1 wherein said means for identifying said second tone codes comprises a DTMF receiver.

5. The system of claim 4 wherein each of said second tone codes includes only one DTMF tone.

6. The system of claim 1 wherein said recorder further comprises means for indicating that one of said voice messages has been recorded.

7. The system of claim 6 wherein said means for indicating comprises visual signaling means.

8. The system of claim 6 wherein said means for indicating comprises aural signaling means.

9. The system of claim 1 wherein said RF transmitter and RF receiver use frequency modulated signals.

10. The system of claim 1 wherein said predetermined time period is from 5 to 200 seconds.

11. The system of claim 1 wherein said telephone receiver further comprises means for entering said first and second tone codes at said telephone receiver.

12. The system of claim 1 wherein each said recorder is in a stuffed animal toy.

13. The system of claim 12 wherein said means for selective playback is in an appendage of said child's toy.

14. A system for recording separately directed messages received on a single telephone receiver in a memory device collocated within a child's toy, the system comprising:

an RF transmitter activated by a predetermined first tone signal received on the telephone receiver;

plural RF receivers remote from said RF transmitter that monitor for messages from said RF transmitter; and plural message recorders, each collocated with a separate one of said RF receivers, for recording messages directed to its one said collocated RF receiver, wherein a second tone signal is received on the telephone receiver from a public telephone system and transmitted by said RF transmitter to said RF receiver to activate recording by the collocated message recorder.

15. The system of claim 14 wherein said first signal comprises at least 2 DTMF tones, and said RF transmitter comprises a DTMF receiver for identifying said DTMF tones.

16. The system of claim 14 wherein said second signal comprises at least one DTMF tone, and said RF receiver comprises a DTMF receiver for identifying said DTMF tone.

17. The system of claim 14 wherein said RF transmitter comprises means to end RF transmission within forty seconds of activation by said first signal.

18. The system of claim 14 further comprising means to enter said first and second signals at the telephone receiver.

19. A child's toy and transceiver system for relaying telephone messages received at a telephone receiver having an interface with a telephone network, said system comprising:

an RF transmitter collocated with the telephone receiver that is activated by a first signal received at the telephone receiver, said RF transmitter for transmitting voice messages received at the telephone receiver for a predetermined period of time; and a child's toy comprising an RF receiver for receiving the voice messages, a recorder for recording one of the voice messages directed to said toy by a second signal, said second signal being received by said telephone receiver over the telephone network and transmitted to said RF receiver, and an indicator that one of the voice messages has been recorded.

20. The system of claim 19 further comprising a second said child's toy that has its said recorder activated by a third signal received at its said RF receiver.

21. The system of claim 19 wherein said recorder comprises a switch for selective playback of the recorded voice message, and wherein said switch is integrated into said toy.

22. The system of claim 21 wherein said toy has an animal-like appearance and said switch is integrated into one of the animal's nose, arm, and clothing.

23. A method of remotely recording voice messages received at a telephone receiver, the method comprising the steps of:

identifying first codes received at the telephone receiver when the telephone receiver is off hook, activating an RF transmitter for a predetermined time period in response to a predetermined one of the first codes;

transmitting a voice message during the predetermined time period;

receiving the transmitted voice message at an RF receiver remote from the RF transmitter;

identifying second codes received with the voice message, said second codes having been received by said telephone receiver from a public telephone system and transmitted by said RF transmitter; and recording the received voice message with a recorder located remotely from said telephone receiver, said recorder being contained within a child's toy and activated by a predetermined one of the second codes.

24. A method of recording separately directed messages received on a single telephone receiver, comprising the steps of:

activating an RF transmitter with a predetermined first signal received on the telephone receiver;

monitoring transmissions from the RF transmitter at plural RF receivers remote from the RF transmitter and telephone receiver, said receivers being contained in a child's toy; and activating a message recorder with a predetermined second signal received by the telephone receiver over a public telephone system and received on the one of the RF receivers associated with the message recorder.

* * * * *